US012326854B1

(12) United States Patent
Bland et al.

(10) Patent No.: US 12,326,854 B1
(45) Date of Patent: Jun. 10, 2025

(54) DATA LANDING ZONE FRAMEWORK

(71) Applicant: WELLS FARGO BANK, N.A., San Francisco, CA (US)

(72) Inventors: Eric Bland, Matthews, NC (US); Bhanuchander Vallabaneni, Indian Land, SC (US); Sunil Pandey, Bangalore (IN); Siva Thurlapati, Hyderabad (IN)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

(21) Appl. No.: 18/597,228

(22) Filed: Mar. 6, 2024

(51) Int. Cl.
*G06F 16/23* (2019.01)
*G06F 16/28* (2019.01)

(52) U.S. Cl.
CPC ........ *G06F 16/2365* (2019.01); *G06F 16/287* (2019.01)

(58) Field of Classification Search
CPC ............................ G06F 16/2365; G06F 16/287
See application file for complete search history.

(56) References Cited

U.S. PATENT DOCUMENTS

| | | | |
|---|---|---|---|
| 9,910,905 B2 * | 3/2018 | Wedgeworth, III | .. G06F 16/215 |
| 10,459,940 B2 | 10/2019 | Prabhu et al. | |
| 11,762,545 B1 * | 9/2023 | Timilsina | ............... G06N 20/00 |
| | | | 715/745 |
| 2011/0153480 A1 * | 6/2011 | Zinow | .................... G06Q 40/03 |
| | | | 726/4 |
| 2016/0358250 A1 * | 12/2016 | Dogin | .................... G06Q 40/03 |
| 2021/0133350 A1 * | 5/2021 | Kirti | .................... G06F 21/6245 |
| 2022/0335354 A1 * | 10/2022 | Morales | ................. G06N 20/00 |
| 2023/0061234 A1 * | 3/2023 | Calado | .................. G06F 21/577 |

FOREIGN PATENT DOCUMENTS

WO 2022189842 A1 9/2022

OTHER PUBLICATIONS

Fikri et al., "An adaptive and real-time based architecture for financial data integration," Journal of Big Data, 2019, vol. 6, No. 97, 25 pages, Available online at: https://link.springer.com/article/10.1186/s40537-019-0260-x.
Creatio, "Unified customer base," Believed to be published at least as early as Dec. 22, 2019, Available online at: https://www.creatio.com/financial-services/bank-sales/360-customer-view.

(Continued)

*Primary Examiner* — Etienne P Leroux
(74) *Attorney, Agent, or Firm* — Kilpatrick Townsend & Stockton LLP

(57) ABSTRACT

Systems and methods for providing a data lineage are described. According to some examples, a method may include receiving a source dataset corresponding to a use case scenario. The method may further include classifying the source dataset based on the use case scenario to create a classified dataset and then applying a set of data processing rules to the classified dataset to create a curated dataset. The method may further include receiving a reporting data object indicating a relationship between the source dataset and the curated dataset. The relationship can describe a data lineage of the source dataset. The method may further include outputting display data associated with the reporting data object.

18 Claims, 11 Drawing Sheets

(56) References Cited

OTHER PUBLICATIONS

Onespan Team, "The 360 Degree View: How Customer Data Fuels a Great Banking Experience," Sep. 9, 2021, Available online at: https://www.onespan.com/blog/360-degree-view-how-customer-data-fuels-great-banking-experience.

Tsurkan, "Revolutionizing Financial Services: AI and ML-driven customer 360 and personalization," Grid Dynamics, Mar. 10, 2023, Available online at: https://blog.griddynamics.com/revolutionizing-financial-services-ai-ml-driven-customer-360-personalization/.

Chojnowska, "Real-time Data Pipelines—Use Cases and Best Practices," Sunscrapers, Aug. 7, 2023, Available online at: https://sunscrapers.com/blog/real-time-data-pipelines-use-cases-and-best-practices/.

Broscorp, "Developing real-time data pipelines for a financial analytics tool," Believed to be published at least as early as Jun. 27, 2022, Available online at: https://broscorp.net/cases/financial-data-pipeline/.

* cited by examiner

DATA LANDING ZONE FRAMEWORK

FIELD OF INVENTION

The present disclosure generally relates to computer and processor architecture techniques, and more specifically to systems and methods for creating dataflows for presenting a three-hundred-and-sixty-degree view of data.

BACKGROUND OF THE INVENTION

Enterprises often use computer-implemented systems and methods to assist with report generation, analysis, and data organization to conduct business and comply with regulatory requirements. For example, under the Federal Reserve (FR) 2052a Complex Institution Liquidity Monitoring Report, certain enterprises are required to report on selected assets, liabilities, funding activities, and contingent liabilities on a consolidated basis and by material entity subsidiary. The reporting scheme under FR 2052a includes sections covering broad funding classifications by product, outstanding balances, and purpose, segmented by maturity date. The reporting and data in the report is used to monitor the overall liquidity profile for enterprises supervised by the Federal Reserve. As is readily apparent by the example provided by FR 2052a, enterprises are often faced with organizing and reporting on an immense amount of data that must be produced in an accurate and efficient manner. Enterprises seeking to comply with such reporting requirements must expend resources to compile data from multiple different sources in a manually intensive effort. Other examples of reporting required by enterprises can include general liquidity reporting, analytics, debt reporting, forecasting, and the like. General liquidity reporting alone, for example, can include an immense amount of source data including, but not limited to, reference data, off balance sheet commercial loans, funded commercial loans, investment securities, cash, debt and affiliates, deposits, retail lending, secured funding, and derivatives.

Contemporary computer-implemented tools used in conjunction with the examples described above require both technology development groups and business groups of an enterprise to manually research and analyze the dataflows of source data as it electronical and/or physically moves between various buckets within the technical architectures of an enterprise. There is a need in the art for improved computer architecture techniques for efficient data pipelines that can rapidly and accurately track the data lineage of source data.

SUMMARY OF THE INVENTION

Embodiments of the present disclosure generally relate to computer and processor architecture techniques, and more specifically to systems and methods for creating dataflows for presenting a three-hundred-and-sixty-degree view of data. According to some examples, a method for displaying the data lineage of source data is provided. The method includes receiving a source dataset corresponding to a use case scenario. In some examples, the use case scenario may correspond to the various use cases of an enterprise, such as, for example, the various use cases described above related to commercial lending, consumer lending, liquidity, and accounting. According to some examples, the source dataset comprises financial data. The method further includes classifying the source dataset based on the use case scenario to create a classified dataset. The method further includes applying a set of data processing rules to the classified dataset. In some examples, applying a set of data processing rules to the classified dataset can create a curated dataset. After creating a curated dataset, the method further includes receiving a reporting data object. In some examples, the reporting data object indicates a relationship between the source dataset and the curated dataset. In some examples, the relationship describes a data lineage of the source dataset. The data lineage can include, for example, characteristics of the source dataset and the curated dataset. The characteristics can include, the data processing rules used to create the curated dataset, the use case scenario corresponding to the source dataset, or the type of data contained in the source dataset. The method further includes outputting display data. In some examples, the display data is associated with the reporting data object.

According to some examples, display data can include a graphical visualization component that describes the relationship between the source dataset and the curated dataset. In this way, a user can view the graphical visualization component to understand the data lineage of the curated dataset or to understand the relationship between the curated dataset and the source dataset.

According to some other examples, the method for displaying the data lineage of source data includes performing a validation check on the source dataset to analyze an accuracy measurement of the source dataset. In some examples, the validation check on the source dataset can assess the accuracy of the source dataset to reduce the risk of error in reporting and to reduce inefficiencies downstream in the enterprise by eliminating the need for downstream users to manually research and analyze how the source datasets move from one use case to another (e.g., from one bucket to another).

According to some other examples, the method includes storing the curated dataset in a network accessible data store. In some examples, the network accessible data store can contain multiple curated datasets. In some examples, the network accessible data store provides a centralized location for access of curated datasets for users or business groups within an enterprise thereby reducing redundancies and duplication of datasets. The network data store improves accuracy and efficiencies of cross sharing of curated datasets. Additionally, each business group can maintain their own set of data processing rules over the curated dataset stored in the network accessible data store. In some examples, a data lineage of the multiple curated datasets stored in the network accessible data store can be accessed to display a relationship between each of the source datasets and data processing rules used to generated each of the curated datasets.

According to some examples, the method further includes receiving an aggregation input. In some examples, the aggregation input can correspond to a user input joining together one or more curated datasets from the multiple datasets stored in the network accessible data store. After aggregating multiple curated datasets together, the processor can update a modification data object to create an updated modification data object. The updated modification data object can include data associated with an updated relationship between the one or more curated datasets joined together. The processor can further output updated display data associated with the updated modification data object.

According to some examples, the method further includes receiving a modification input. The modification input can describe a modification to at least one rule of the set of data processing rules used to create a curated dataset. The method can further include performing the modified data processing rule on a classified or curated dataset to create a modified curated dataset, and based on the modified curated dataset, a modified data object can be received that indicates a modified relationship between the curated dataset and the modified curated dataset. The method can further output updated display data associated with the modified data object.

According to some examples, a system for displaying the data lineage of source data is provided. The system includes a processor coupled to a memory that stores instructions. The instructions are executed by the processor and cause the processor to receive a source dataset corresponding to a use case scenario. In some examples, the use case scenario may correspond to the various use cases of an enterprise, such as, for example, the various use cases described above related to commercial lending, consumer lending, liquidity, and accounting. According to some examples, the source dataset comprises financial data. The processor can further classify the source dataset based on the use case scenario to create a classified dataset. The processor can further apply a set of data processing rules to the classified dataset. In some examples, applying a set of data processing rules to the classified dataset can create a curated dataset. The processor can further receive a reporting data object. The reporting data object can indicate a relationship between the source dataset and the curated dataset. In some examples, the relationship describes a data lineage of the source dataset. The data lineage can include, for example, characteristics of the source dataset and the curated dataset. The characteristics can include, the data processing rules used to create the curated dataset, the use case scenario corresponding to the source dataset, or the type of data contained in the source dataset. The processor can further output display data associated with the reporting data object.

According to some other examples, display data that is output by the processor can include a graphical visualization component that describes the relationship between the source dataset and the curated dataset. In this way, another system (e.g., another computer device, server, or the like) or user can view the graphical visualization component to understand the data lineage of the curated dataset or to understand the relationship between the curated dataset and the source dataset.

According to some other examples, the instructions stored in memory can further cause the processor to perform a validation check on the source dataset to analyze an accuracy measurement of the source dataset. The validation check on the source dataset can assess the accuracy of the source dataset to reduce the risk of error in reporting and to reduce inefficiencies downstream in the enterprise by eliminating the need for downstream users to manually research and analyze how the source datasets move from use case to another (e.g., from one bucket to another).

According to some other examples, the instructions stored in memory can further cause the processor to store the curated dataset in a network accessible data store. The network accessible data store can contain multiple curated datasets. The network accessible data store provides a centralized location for access of curated datasets for users or business groups within an enterprise thereby reducing redundancies and duplication of datasets. The network data store improves accuracy and efficiencies of cross sharing of curated datasets. Each business group can maintain their own set of data processing rules over the curated dataset stored in the network accessible data store. In some examples, a data lineage of the multiple curated datasets stored in the network accessible data store can be accessed to display a relationship between each of the source datasets and data processing rules used to generated each of the curated datasets.

According to some examples, the instructions stored in memory can further cause the processor to receive an aggregation input. The aggregation input can correspond to a user input joining together one or more curated datasets from the multiple datasets stored in the network accessible data store. After aggregating multiple curated datasets together, the processor can update a modification data object to create an updated modification data object. The updated modification data object can include data associated with an updated relationship between the one or more curated datasets joined together. The processor can further output updated display data associated with the updated modification data object.

According to some examples, the instructions stored in memory can further cause the processor to receive a modification input. The modification input can describe a modification to at least one rule of the set of data processing rules used to create a curated dataset. The method can further include performing the modified data processing rule on a classified or curated dataset to create a modified curated dataset, and based on the modified curated dataset, a modified data object can be received that indicates a modified relationship between the curated dataset and the modified curated dataset. The processor can further output updated display data associated with the modified data object.

According some other examples, a non-transitory computer-readable medium embodying program code is provided. The program code, when executed by a processor, causes the processor to receive a source dataset corresponding to a use case scenario. In some examples, the use case scenario may correspond to the various use cases of an enterprise, such as, for example, the various use cases described above related to commercial lending, consumer lending, liquidity, and accounting. According to some examples, the source dataset comprises financial data. The processor can further classify the source dataset based on the use case scenario to create a classified dataset. The processor can further apply a set of data processing rules to the classified dataset. In some examples, applying a set of data processing rules to the classified dataset can create a curated dataset. The processor can further receive a reporting data object. In some examples, the reporting data object indicates a relationship between the source dataset and the curated dataset. In some examples, the relationship describes a data lineage of the source dataset. The data lineage can include, for example, characteristics of the source dataset and the curated dataset. The characteristics can include, the data processing rules used to create the curated dataset, the use case scenario corresponding to the source dataset, or the type of data contained in the source dataset. The processor can further output display data. In some examples, the display data is associated with the reporting data object.

The above methods and systems can be implemented as computer-executable program instructions stored in a non-transitory, tangible computer-readable medium or media and/or operating within a processor or other processing device and memory. Furthermore, these illustrative embodiments are mentioned not to limit or define the disclosure, but to provide examples to aid understanding thereof.

BRIEF DESCRIPTION OF THE DRAWINGS

A full and enabling disclosure is set forth more particularly in the remainder of the specification. The specification makes reference to the following appended figures. These illustrative embodiments are mentioned not to limit or define the disclosure, but to provide examples to aid understanding thereof. Aspects and features of the various embodiments will be more apparent by describing examples with reference to the accompanying drawings, in which.

DETAILED DESCRIPTION

Figure 1:
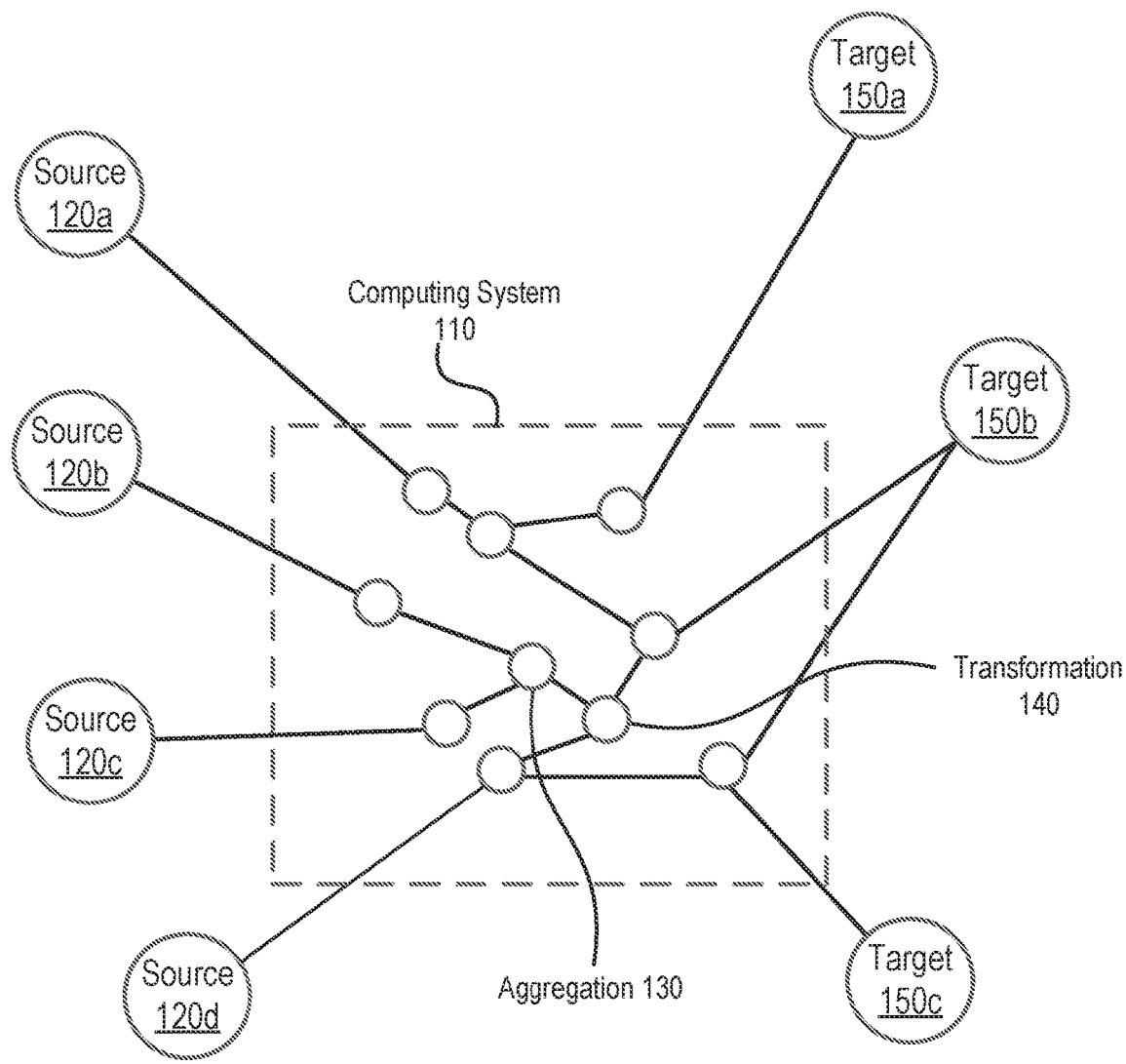
FIG. 1 is a block diagram illustrating an example of data lineage of source data, according to some aspects of the present disclosure.

Examples of the present disclosure generally relate to computer and processor architecture techniques, and more specifically to systems and methods for creating dataflows for presenting a three-hundred-and-sixty-degree view of data.

The following examples are provided to introduce certain example of the present disclosure. In some example implementations, the technical architecture described in relation to the figures below can provide a streamlined dataflow to allow users to view a complete three-hundred-and-sixty-degree view of data. A computing system uses a data sourcing process operating on a processor of the computing system. The data sourcing includes identifying source data and classifying the source data based on its use case. The use case can correspond to the various use cases involved in operations of an enterprise, including, for example, use cases described above related to commercial lending, consumer lending, liquidity, and accounting. Then a wired or wireless connection is established by the computing system to collect and store the source data in a data landing zone framework for use and access across multiple business groups. The computing system can utilize a conceptual input storage layer to store the classified source data to ensure all business groups interacting with the data landing zone framework are using the same dataset. In this way, storage in the conceptual input storage layer can be referred to as tenant curated meaning that each tenant (e.g., business group or members of a business group) can access the data landing zone. Additionally, the source data stored in the data landing zone framework can be labeled using metadata that is based on a common plain business language to establish versioned data contracts.

In some examples, storage at the conceptual input storage layer of the data landing zone can be a temporary data store. In some other examples, the data stores can be virtualized in a cloud computing system and the temporary data store can migrate to an object data store. The object data store can be stored in a cloud environment that enables a minimized amount of data movement and redundancy. In some examples, users can access the source data across the enterprise without moving physical data between warehouses thereby reducing infrastructure costs and technology labor. This also can reduce the number of times data is replicated thus speeding up the time to market for critical data analytics and reporting requirements.

Additionally, a user interacting with the data landing zone framework can join together source data and apply data processing rules on the source data or curated datasets to define relationships between the source data and the curated datasets. These relationships can be used for management reporting and analytics and can be created without having to physically move data. Ultimately, the use of virtualized datasets and self-service interactions with the data landing zone framework can enable self-service capabilities and reduce the number of time data is replicated thus speeding up time to market for critical data analytics and reporting requirements.

The computing system can further enable a reporting object integrated that allows for visualization of display data corresponding to source data, curated datasets, and data lineage. The display data can be organized on a virtual canvas to build and distribute reports in a graphical or non-graphical manner. The metadata in the data landing zone framework can be driven by plain business terms to enable consistent business operations and toolsets. The data lineage displayed by the display data can describe the complete data lineage of the source data and curated datasets generated and stored in the data landing zone framework. In other words, the complete data lineage can represent the relationship between the source data and the curated dataset where the relationship describes the data processing rules used to generate the curated datasets. In this way, the computing system can provide a three-hundred-and-sixty-degree view of data lineage as elements are transformed to create fit for purpose datasets tied to established use cases.

Furthermore, storage of the classified source data in the data landing zone framework can be tenant curated. A tenant can be an entity such as a user of the data landing zone framework, a business group, or process that interacts with the source data and the data landing zone framework. In some examples, a tenant can be a group of users or a group of business groups with common access to the source data stored in the data landing zone. Common access can include common read and write privileges such that each tenant can interact with the source data to perform data processing rules and logic operations on the source data. The tenant curated data landing zone corresponds to each tenant using the computing system to establish versioned data contracts. The source data and curated datasets virtualized in the data landing zone framework can be created and governed by business users and groups (e.g., multi-tenant) via a self-service process to minimize the replication of source data and curated datasets.

Moreover, the data landing zone can group curated datasets into various buckets for storage in the data landing zone framework. Based on the multi-tenant structure of an enterprise, tenants can then be granted access the buckets. For example, buckets may include commercial lending, consumer lending, liquidity, accounting, and any other example described herein. Tenants associated with target use cases can be placed into access groups that have read and write functionality over the buckets. For example, one tenant may be a liquidity tenant. In this example, a liquidity tenant may need read and write access to all buckets in the data landing zone (e.g., commercial lending, consumer lending, liquidity, and accounting) in order to properly report on liquidity. As a result, the liquidity tenant can be granted access to the buckets pertaining to the use case scenario corresponding to their area, group, or organization. Each tenant within an enterprise could be given control and functionality or restricted to viewing only depending on the use case scenario and the area, group organization they are a part of.

Numerous benefits are achieved by way of the present disclosure over conventional techniques. For example, the data processing techniques described above reduce the number of hops (physical data movement) to deliver fit for purpose curated datasets given the centralized control, storage, and operation in the data landing zone framework. Another benefit is that all activities performed within the data landing zone benefit from being on the same technical architecture, using the same data processing rules engine, sharing the same data lineage views, and sharing the same data dictionary (e.g., common metadata). Additionally, tenants given proper access and authority can interact with the data landing zone by providing inputs and modifying outputs. In this way, the tenants can build their own logic directly into the source data or the curated datasets stored in the data landing zone framework based on their particular use case.

Furthermore, use of the data landing zone framework can grow within an enterprise as commonalities in data usage and data processing rules between business groups increases. In other words, the multi-tenant nature of the data landing zone framework allows users from business various business groups to access curated datasets for individual use case scenarios based on a common business plain language thereby reducing duplication of datasets, reducing the risk of errors in reporting, and increasing the efficiency by which an enterprise understands their business. Moreover, the data landing zone framework enables reporting to generate display data to graphically or non-graphical produce a three-hundred-and-sixty-degree view of data across an enterprise to give a user a complete understanding of the relationship between the source data and the curated datasets. These and other embodiments of the present disclosure along with many of its advantages and features are described in more detail in conjunction with the text below and the attached figures.

Reference will now be made in detail to various and alternative illustrative examples and to the accompanying drawings. While certain embodiments are described, these embodiments are presented by way of example only and are not intended to limit the scope of protection. The apparatuses, methods, and systems described herein may be embodied in a variety of other forms. Furthermore, various omissions, substitutions, and changes in the form of the example methods and systems described herein may be made without departing from the scope of protection. It will be apparent to those skilled in the art that modifications and variations can be made.

FIG. 1 is a block diagram illustrating an example of a data lineage of source data, according to some aspects of the present disclosure. FIG. 1 illustrates a simplified representation of the conceptual path that source data may take through a computing system and to a target output. The block diagram illustrated in FIG. 1 may be representative of the challenges and issues described above in relation to the background. The conceptual path that the source data takes through a computing system to a target output can be referred to as the data lineage. As illustrated in FIG. 1, source data 120a-d can be provided as input into computing system 110. Source data 120a-d can correspond to the various examples of source data described herein (e.g., commercial loans, consumer loans, cash, debt, investment securities and the like). As will be evident one of ordinary skill in the art, the number of source data illustrated in FIG. 1 is not intended to be construed as a limitation. The number of sources could be any number of sources that impact involve data corresponding to enterprise operations.

As further illustrated by FIG. 1, system 100 also includes computing system 110. Computing system 110 is illustrated in FIG. 1 at a high level, but generally refers to the computing system that performs the data processing rules on source data and other development tools used by an enterprise to analyze the source data 120a-d. Additionally, the various connections illustrated inside computing system 110 provide a high level depiction of different operations (e.g., transformation 140 and aggregation 130) that can be performed by the computing system 110 on the source data 120a-d. These operations can correspond to different use cases that users interacting with computing system 110 need to perform to meet the various analytics, reporting, and regulatory requirements that can face an enterprise.

System 100 also includes a plurality of targets 150a-c. Targets 150a-c illustrated in FIG. 1 can correspond to the use case scenarios for the source data 120a-d discussed above in relation to the background. These use cases, for example, could refer to a liquidity reporting application that utilizes the data provided by the various source data 120a-d to generate a comprehensive report that complies with the requirements of FR 2052a reporting. As another example, targets 150a-c could also refer to a target use case that is internal to an enterprise such as internal budgeting or forecasting. Each target 150a-c utilizes the computing system 110 to perform transformations 140, aggregations 130, and other data processing rules on source data 120a-d to generate curated datasets that are fit for purpose corresponding to the use case scenario of the target.

As described above, computing system 110 includes generalized operations that can be performed by computing system 110 illustrated as aggregation 130 and transformation 140. Aggregation 130 can refer to the operation of joining together multiple source data such as source data 120a-d. In one example, if source data 120a represents cash held in trust accounts and source data 120b represents cash held in a savings account, aggregation 130 may represent the joining to these two sources together to provide for a total cash curated dataset. The data processing rules and inner operations of computing system 110 are discussed in more detail below.

Computing system 110 also includes an operation labeled as transformation 140. Transformation 140 can refer to the operation of modifying source data such as source data 120a-d. In one example, source data 120c can correspond to total debt held by a business. In this case, after source data 120a and source data 120b are aggregated together at aggregation 130 as described above, the curated dataset and the source data 120c could be transformed by transformation 140 into a liquidity value by subtracting source data 120c, representing debt, from the curated dataset generated by aggregation 130. The resulting curated dataset could represent total cash less debt. The curated dataset generated at transformation 140 can then be output to target 150b, which in some cases, can represent a reporting use case that requires the business to report on total cash less debt.

The block diagram illustrated in FIG. 1 provides for a simplified example of the challenges that the present disclosure seeks to address. In particular, a business can routinely be faced with multiple use case scenarios that require data from multiple sources to be joined together or otherwise transformed. Additionally, the same source data might need to be used across multiple use case scenarios (e.g., targets 150a-c). This reality of enterprise operations leads to multiple transformations, aggregations, and other data processing rules to create a desired curated dataset output. Conventional processing techniques fail to address these redundancies leading to inaccuracies and manual verification of source data and curated outputs and data processing to ensure accuracy as the data moves from one bucket within the computing system to another.

The improved methods and systems described herein provide for improved understanding of the data lineage of source datasets to provide users and businesses with a three-hundred-and-sixty-degree view of data. In some examples, this could mean that an enterprise with a target use case, such as target 150a, would be able to utilize the systems and methods discussed herein to reverse track the data lineage (e.g., each data processing rule) used to compile the target. The data lineage could reveal the relationship between the target output all the way back to the source data (e.g., source data 120a-d) to provide a complete understanding of the how the target was generated. Additionally, the computing system could provide for shared access across a network so that source data can be stored in a centralized data landing zone framework to allow for access by multiple groups and users that span a business. In this way, redundancies would be minimized, and source data would not be duplicated or reproduced thereby increasing the accuracy and efficiencies of the computing systems used to implement these systems and methods.

Figure 2:
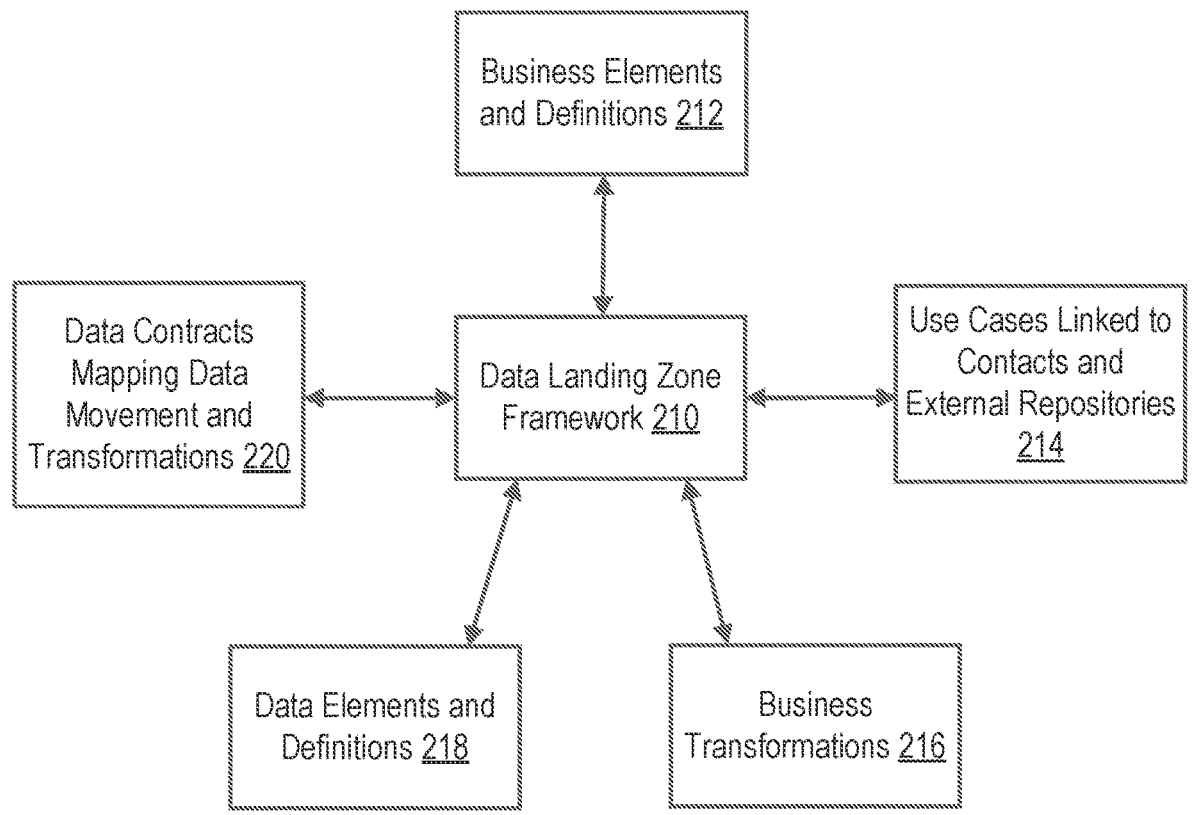
FIG. 2 is a block diagram illustrating an example of metadata associated with a data landing zone framework, according to some aspects of the present disclosure.

FIG. 2 is a block diagram illustrating metadata associated with a data landing zone framework, according to some aspects of the present disclosure. To improve the efficiency of data organization, metadata is important tool that can be used to describe other data to provide for a structured reference to sort and identify attributes of the data it describes. FIG. 2 illustrates a data landing zone framework 210 with various connections to different metadata labels. As described herein, the data landing zone framework 210 can be assessed by multiple business groups and users across an enterprise. Because multiple business groups can access the centralized data landing zone framework 210, the metadata describing the data lineage needs to be tied to the data processing rules and plain business language for ease of understanding. Once the metadata is established, a computing system, such as computing system 110, can process, through a common execution framework, to provide for a complete data lineage of the data described by the metadata.

As illustrated in FIG. 2, data contracts mapping data movement and transformations 220 can be one form of metadata that describes the ways in which data should be structured, organized, and exchanged between different systems, applications, and users. In other words, it is a contract (e.g., a set of guidelines) used to govern the formal, content, and quality of the shared data so that it can be used effectively by downstream processes, such as data pipelines.

Business elements and definitions 212 can be another form of metadata that may provide business context to other data. For example, business elements and definitions could be expressed by a dictionary or glossary as a part of the metadata to assist in making meaning explicit, providing definitions to business terms, data elements, acronyms, and abbreviations.

Use cases linked to contracts and external repositories 214 can be another form of metadata that can correspond to describing particular use case scenarios, target datasets, applications, and the like associated with source data.

Business transformations 216 can be another form of metadata that can describe the data processing rules involved in the creation, management, and governance of source data and curated datasets within a data landing zone framework 210. Business transformations 216 can provide accurate labeling to allow an enterprise to maximize the use of source data and curated data in order to make informed decisions.

Data elements and definitions 218 can be another form of metadata that can describe, similar to business elements and definitions 212, a context to the source data and the curated datasets. In some examples, the context can be associated with a specific use case and the metadata can be pulled from a dictionary or glossary of common terms associated with the enterprise to assist the multiple business groups in understanding.

Figure 3:
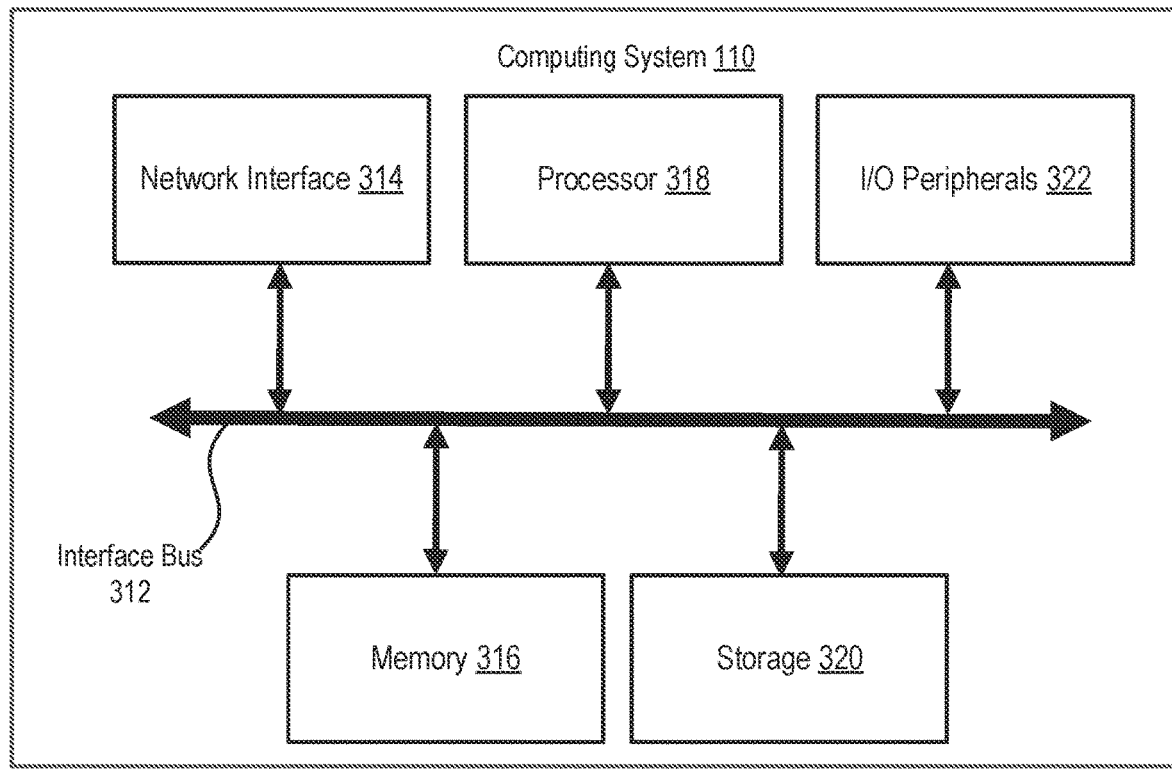
FIG. 3 is a block diagram illustrating an example computing system for generating a data lineage, according to some aspects of the present disclosure.

FIG. 3 is a block diagram illustrating an example computing system 110 for generating a data lineage from a data landing zone framework, according to some aspects of the present disclosure. While computing system 110 is illustrated in FIG. 3, any suitable computing system or group of computing systems can be used to perform the operations described herein. As illustrated in FIG. 3, computing system 110 includes one or more processors 318 communicatively coupled along interface bus 312 to at least one memory 316. The processor 318 executes computer-executable program code or accesses information stored in memory 316. Examples of processor 318 include a microprocessor, an application-specific integrated circuit ("ASIC"), a field-programmable gate array ("FPGA"), or other suitable processing device. Processor 318 can include any number of processing devices, include one, as illustrated in FIG. 3, or more than one.

Memory 316, communicatively coupled along interface bus 312, can include any suitable non-transitory computer-readable medium for storing the instructions executed by processor 318. The computer-readable medium can include any electronic, optical, magnetic, or other storage device capable of providing a processor with computer-readable instructions or other program code. Non-limiting examples of a computer-readable medium include a magnetic disk, a memory chip, a read-only memory (ROM), a random access memory (RAM), an ASIC, electrically erasable programmable read-only memory (EEPROM), hard-drives, optical storage, magnetic tape or other magnetic storage, electronic non-volatile computer storage, for example Flash® memory, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript.

Optionally, computing system 110 may include additional storage, such as storage 320. Storage 320 can include additional storage that is removable or non-removable. Additionally, storage 320 can store computer readable instructions to implement an operating system, an application program, and the like that can be accessed in memory 316 for execution on the one or more processor, such as processor 318. Furthermore, and although not illustrated in FIG. 3, processor 318, memory 316, and storage 320 can be virtualized and can be hosted within another computer system or environment, for example, a cloud network or a data center. One of ordinary skill in the art would recognize many further combinations, permutations, and alternatives.

Computing system 110 also include a number of external or internal devices such as input or output devices. For example, the computing system 110 is illustrated with input/output (I/O) peripherals 322 that can receive input from input devices or provide output to output devices. The I/O peripherals 322 are communicatively coupled along interface bus 312 and can also interact with the other elements of computing system 110 such as processor 318, storage 320, and memory 316.

The computing system 110 also includes at least one network interface 314 communicatively coupled along interface bus 312. Network interface 314 includes any device or group of devices suitable for establishing a wired or wireless connection to one or more networks, such as network 470 illustrated in relation to FIG. 4. Non-limiting examples of the network interface 314 include an Ethernet network adapter, a modem, and/or the like. For example, a user device, such as user device 460 illustrated in FIG. 4 and FIG. 7 and described in more detail below, can connect with computing system 110 via network interface 314, and user device 460 can perform some of the operations described herein, such as generating a reporting data object for display. Additionally, computing system 110 can communicate with one or user devices using the network interface 314. More detail regarding the communications operations between the computing system 110 and the various examples of source data, user devices, target use cases, and networks are described below.

Figure 4:
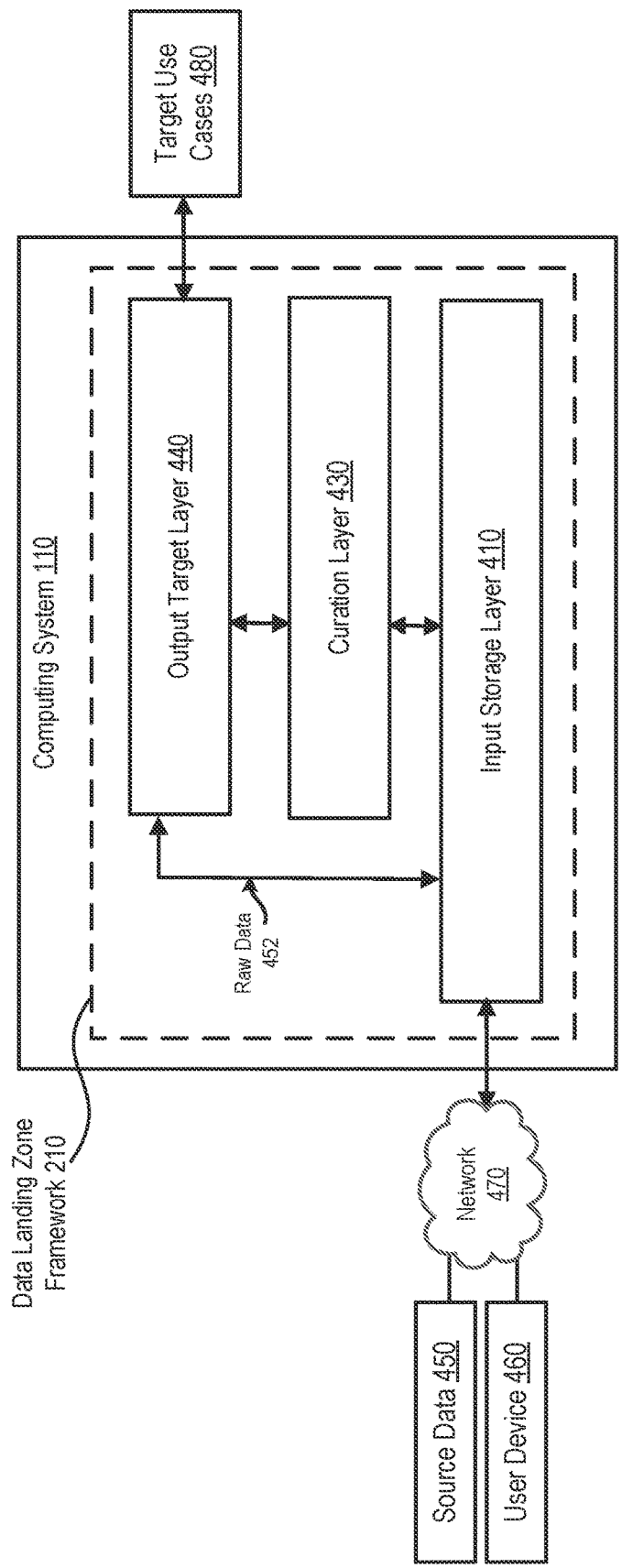
FIG. 4 is a block diagram illustrating an example computing environment for generating a data lineage of source data, according to some aspects of the present disclosure.

FIG. 4 is a block diagram illustrating an example computing environment 400 for generating a data lineage of source data, according to some aspects of the present disclosure. FIG. 4 illustrates computing environment 400 that can implement any of the computing systems, such as computing system 110, or environments described herein. FIG. 4 illustrates computing system 110, as described above in reference to FIG. 3, but FIG. 4 illustrates additional components to computing environment 400 that add additional functionality to the examples described herein.

Computing environment can include source data 450. Source data 450 can generally refer to the various sources of data that a business collects and utilizes in day-to-day business operations. Source data 450 is discussed above in relation to source data 120a-d in relation to FIG. 1 and more details are provided below in relation to FIG. 5. Computing environment also can include target use cases 480. Target use cases 480 is discussed above in relation to targets 150a-c in relation to FIG. 1 and more details are provided below in relation to FIG. 8. In general, however, target use cases 480 can relate to the various use case scenarios of source data 450 that an enterprise requires for analytics or regulatory reporting.

Computing environment 400 also includes user device 460. User device 460 can connect to computing system 110 through network 470, which in turn, connects with computing system 110 at network interface 314 discussed above in relation to FIG. 3. User device 460 is described in more detail in conjunction with FIG. 7, however, user device 460 generally can perform operations on computing system 110 such as providing inputs and receiving outputs. For example, one operation can include instructing the computing system 110 to perform operations on source data, such as combining multiple datasets together, to create an aggregated dataset. User device 460 can also instruct computing system 110 to output the aggregated dataset for a particular target use case, such as is depicted by target use case 480.

As further illustrated in FIG. 4, three conceptual architectural layers are depicted inside computing system 110. These conceptual layers are drawn as simplified block diagrams in FIG. 4 and are discussed in more detail below in relation to FIG. 6; however, the three architectural layers conceptually provide for a visualized representation of the methods and systems for provided a data lineage of source data and target use cases to provide for a three-hundred-and-sixty-degree view of data using a data landing zone framework 210. Computing system 110 and the conceptual layers illustrated within it perform the functions of consolidating source data 450, providing a shared governance and services of the source data 450, and allowing access to the source data 450 in a multi-tenant framework. The conceptual layers illustrated in FIG. 4 are conceptual in the sense that they illustrate a processing technique implement by the processor of computing system 110. Thus, even though the conceptual layers may be described below as performing functions, this is for simplicity, and one of ordinary skill would recognize that the operations are performed on the processor of computing system 110.

The first conceptual layer including in computing system 110 is input storage layer 410. Input storage layer 410 can receive, via network 470, source data 450 from user device 460 as input. Input storage layer 410 can store the source data 450 for processing on computing system 110. In some examples, the source data 450 can be added to a pool of aggregated and consumable data and made into a shared product view, such as a finance shared product view. Then, the product view of the aggregated and consumable data can be provided as an output and transformed into consumable information for stakeholders across the product platform. In this way, redundant processes may be eliminated by the computing system 110 because the shared product view eliminates the need to recreate or duplicate the information.

The second conceptual layer is curation layer 430. After source data 450 is stored in input storage layer 410, tenants of computing system 110 can access the source data 450 to perform transformations, aggregations, modifications, and the like on the source data 450 corresponding to their particular use case scenario. Thus, the curation layer 430 conceptually represents a tenant controlling their own logic and data processing rules to generate curated datasets from source data 450 based on specific use case scenarios. In some examples, after the source data has undergone storage, normalization, validation, and quality checks, the curated datasets can be added to a pool of aggregated and consumable data and made into a shared product view, such as a finance shared product view. Then, the product view of the curated datasets can be provided as an output and transformed into consumable information for stakeholders across the product platform. In this way, redundant processes may be eliminated by the computing system 110 because the shared product view eliminates the need to recreate or duplicate the information. Thus, a user can have access to the curated datasets through the data landing zone framework as access to the source data 450.

The third conceptual layer is output target layer 440. After source data 450, which is stored in input storage layer 410, is processed by the data processing rules associated with curation layer 430, the curated datasets can be stored in output target layer 440. Output target layer 440 conceptually represents a centralized storage zone for curated datasets. In some examples, source data 450 may bypass curation layer 430 and the raw data 452 corresponding to the source data 450 may be stored in directly at output target layer 440. Thus, output target layer 440 can conceptually contain both source data 450 and curated datasets that have been processing through data landing zone framework 210. As discussed below, a data lineage of the source data 450 and curated datasets can be provided that describes a relationship between the source data 450 and the curated dataset such that a three-hundred-and-sixty-degree view of the data can be understood. The conceptual layers of data landing zone framework 210 provide for a new and unique way of processing dataflows to improve the functionality of computing system for business applications.

As further illustrated in FIG. 4, computing environment 400 can further include target use cases 480. Target use cases can refer to the use case scenarios for source data 450 and curated datasets stored at output target layer 440. According to some examples, target use cases 480 provides for a multi-tenant approach as it allows multiple teams within a business (e.g., multiple finance teams) to crowd source and derive fit for purpose datasets from the data landing zone framework 210. In this way, the resources involved (both financially and computationally) with the infrastructure and support systems needed can be reduced resulting in cost savings for the enterprise and infrastructure savings for the technology. Additionally, and although not illustrated in FIG. 4, a workflow engine can interact with the target use cases 480 and computing system 110 to connect various processes and systems handling specific use cases by making connections between systems and models, thereby orchestrating a full end-to-end process. In other words, target use cases 480 can include a business group that uses an application programming interface (API) for performing use-case specific transformations and adjustments to the source data 450 and curated datasets stored at the output target layer 440.

Figure 5:
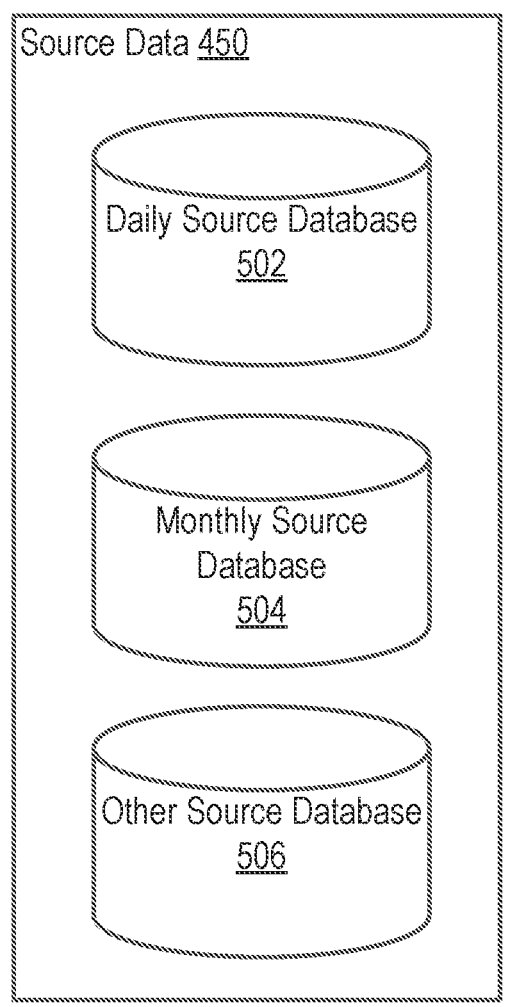
FIG. 5 is a block diagram illustrating an example of source data, according to some aspects of the present disclosure.

FIG. 5 is a block diagram illustrating an example of source data, according to some aspects of the present disclosure. As illustrated in FIG. 5, source data 450 can comprise a plurality of different data sources such as daily source database 502, monthly source database 504, and other source database 506. The source data 450 can refer to any data associated with a business or enterprise. As one of ordinary skill in the art would recognize, source data 450 includes an immense amount of data. By way of example, with respect to a financial institution, source data 450 can include deposits, secured funding, loans, derivatives, cash, debt, and investment securities, for example. Additionally, these sources can be monthly sources or daily sources such as daily cash deposits or aggregated monthly cash deposits. As described above in relation to FIG. 4, source data 450 can be provided as an input to computing system 110 for processing and storage in the data landing zone framework 210. Additionally, in some examples, the source data 450 can be classified based on the type of data contained in source data. The classification can utilize the common metadata tags described in relation to FIG. 2. Additionally or alternatively, the classified source data can be stored in buckets in the data landing zone framework 210 for ease of access and understanding. For example, the buckets can include commercial lending, consumer lending, liquidity, and accounting.

Figure 6:
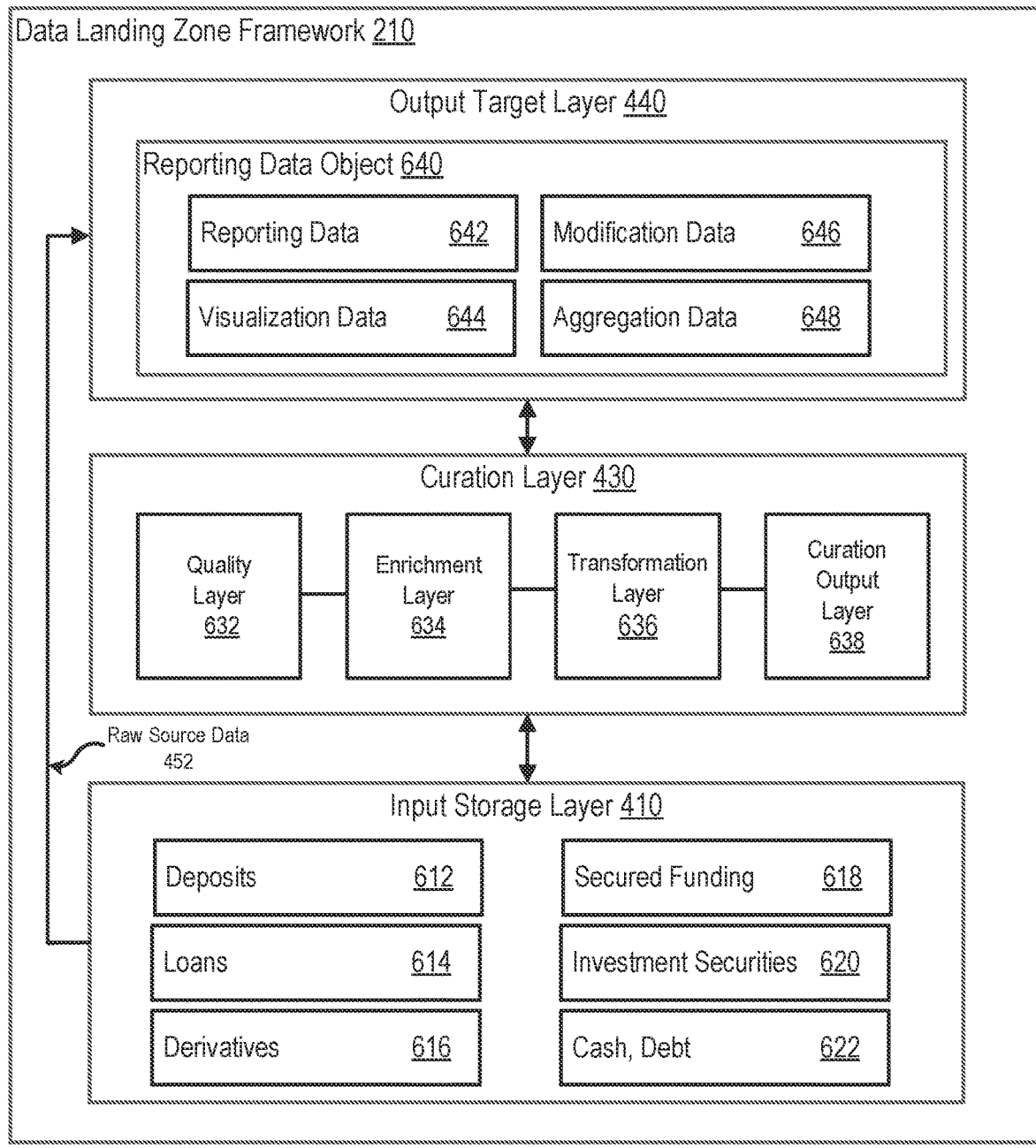
FIG. 6 is a block diagram illustrating an example of conceptual layers showing a processing technique implemented by a computing system, according to some aspects of the present disclosure.

FIG. 6 is a block diagram illustrating an example of conceptual layers showing a processing technique implemented by a computing system, according to some aspects of the present disclosure. As discussed above, data landing zone framework 210 provides a conceptual technical architecture for a computing system 110 that may be performed on a processor 318 based on instructions stored in memory 316 or storage 320. Additionally, a user may interaction with the data landing zone framework 210 through user device 460 connected to I/O peripherals 322 to provide modifications, aggregations, and other forms of transformations to interact with the data landing zone framework 210 based on a particular use case scenario.

As illustrated in FIG. 6, data landing zone framework 210 includes three conceptual layers for processing source data 450. The first layer is a input storage layer 410, the second layer is a curation layer 430, and the third layer is an output target layer 440. At the input storage layer 410, source data 450 is input into data landing zone framework 210 and the processor 318 can perform operations to store the source data 450 in memory 316 or storage 320. Additionally, the data landing zone framework 210 may be virtualized, such as on a cloud virtual network, such that the data landing zone framework 210 can be a centralized computing system that may be accessed by multiple tenants across an enterprise. Examples of source data 450 that may be classified and stored by the processor 318 in memory 316 at the conceptual input storage layer 410 include deposits 612, loans 614, derivatives 616, secured funding 618, investment securities 620, and cash/debt 622. As discussed in the present disclosure, the examples of source data 450 are not intended to be limiting but are merely illustrative of the various sources of data that a business or enterprise may account for.

The second layer is a curation layer 430. Curation layer 430 includes four additional sub-layers within curation layer 430. Curation layer 430 can perform operations on the source data 450. Processing the source data 450 can include a variety of different processing steps and techniques. Furthermore, and as mentioned throughout the present disclosure, data landing zone framework 210 can be centrally located via a cloud network. In examples include a centrally located data landing zone framework 210, different tenants from the enterprise can access the curated data generated by the processor at the conceptual curation layer 430. This operation serves numerous benefits for an enterprise. For example, since the curated data is centrally located, it reduces the amount of processing that needs to be performed on source data 450. Reducing the amount of processing optimizes the computational infrastructure needed by an enterprise because the curated datasets can be shared across multiple use cases. Additionally, curation layer 430 improves the accuracy of curated datasets because the source data 450 is not replicated multiple times by multiple different groups. Rather, source data 450 is processed, for example, one time through curation layer 430 where it is quality checked, enriched, transformed, and stored as a curated dataset. Then, multiple tenants can access the curated dataset via the data landing zone framework 210 and use it based on their particular use case scenario.

The first sub-layer included in curation layer 430 is quality layer 632. The processor at quality layer 632 can perform quality checks on the source data 450 that is input into the input storage layer 410. Data quality checks include any method to identify discrepancies, errors, or inconsistencies that could impact the usability and credibility of data. After quality checks are performed by the processor, the quality checked source data is processed by the processor at the second sub-layer included in curation layer 430, which is enrichment layer 634.

At the enrichment layer 634, the processor can perform operations to enrich the data received from the quality layer 632. Enrichment of datasets generally refers to the process of enhancing the existing information by supplementing missing or incomplete portions of the datasets. For example, if the processor determines at the quality layer 632, that there are inaccuracies or missing values in the source data 450, then these values could be flagged by the processor so that corrections can be made by the processor at the enrichment layer 634. In some examples, data enrichment techniques may include standardizing the source data or adding metadata tags to the data that are common across an enterprise thereby labeling the data in a way that is understood by all groups of an enterprise. In some examples, metadata tags can be compiled from a common data dictionary used across an enterprise. The metadata can correspond to plain business elements and definitions as discussed in relation to FIG. 2, for example. For example, enrichment layer 634 can use the metadata label of "cash" to label source data 450. This business term can be applied in the same way to any source data describing cash. A standardization of datasets by the enrichment layer eliminates the need for subjective interpretation of labels and meanings thereby improving the efficiency and accuracy in regulatory reporting and auditing.

The third sub-layer included in curation layer 430 is transformation layer 636. Transformation layer 636 can enable users connected to the data landing zone framework 210 to join together datasets and define relationships which can be used for management reporting and analytics. In other words, the transformation layer includes data processing rules governed by individual use case scenarios to performs operations on the source data 450 based on specific needs of the user. Additionally, the centralized nature of the data landing zone framework 210 can allow users from different business groups to perform operations on source data 450 without having to physically move the data.

Once transformations are performed on the source data 450 at the transformation layer 636, the resulting data can be referred to as a curated dataset. The curated dataset can be sent by the processor to the conceptual fourth sub-layer included in curation layer 430, which is curation layer output 638. At curation layer output 638, curated datasets are labeled with the appropriate metadata tags and assigned to an "owner." An owner can be the user or tenant that generated the curated dataset. Standardization of labeling and centralized storage of the curated datasets ensures that the data is not duplicated as access is enabled for downstream systems and users.

The third conceptual layer of the data landing zone framework is an output target layer 440. Output target layer 440 includes reporting data object 640. Reporting data object 640 is a data object that can be generated in response to user input from user device 460 or in response to a command from another computing device. Additionally, reporting data object 640 is a data object that can contains information that can be displayed. For example, reporting data object 640 can include reporting data 642. Reporting data 642 can represent a data lineage of a curated dataset. The data lineage can indicate a relationship between the curated dataset and the source data 450 used to generate the curated dataset. For example, the relationship may indicate the quality of the dataset corresponding to the quality check performed by the processor at the conceptually quality layer 632 of curation layer 430. The quality relationship displayed by the reporting data object can thus indicate an accuracy of the curated dataset so that the particular user or tenant can be assured of the validity and health of the dataset.

Reporting data object 640 also includes visualization data 644. As discussed in relation to FIG. 7, below, visualization data 644 can correspond to a graphical or non-graphical visualization component for display on user device 460. The visualization data 644 can visually represent the data lineage of a curated dataset. In other words, the visualization data sent to the user device may display information indicating a relationship between the curated dataset and the source data 450 used to create the curated dataset thereby giving a user a complete three hundred and sixty degree view of the data.

Reporting data object 640 also include modification data 646. Modification data 646 can correspond to modification input data 710 discussed below in relation to FIG. 7. In some examples, a tenant interacting with data landing zone framework 210 can perform operations on the curated datasets and source data depending on a specific use case corresponding to the tenant. This can include, for example, modifying one or more curated datasets or one or more source data. In this example, the tenant can provide inputs to the data landing zone framework 210 to instruct the processor to perform operations on the corresponding dataset such as modifying a data processing rule used to create the curated dataset. The modification can be expressed by modification data 646. After modifying the corresponding dataset, the reporting data object 640 can update in response to the modification and provide an updated reporting data object indicating an updated relationship between the modified curated dataset and the original curated dataset or source data.

Reporting data object 640 also includes aggregation data 648. Aggregation data 648 can correspond to aggregation input data 712 as discussed below in relation to FIG. 7. In some examples, a tenant interacting with data landing zone framework 210 can perform operations on the curated datasets and source data depending on a specific use case corresponding to the tenant. This can include, for example, aggregating together multiple curated datasets for a specific reporting requirement. In this example, the tenant can provide inputs to the data landing zone framework 210 to instruct the processor to perform operations to aggregate together multiple curated datasets. This aggregation operation can be expressed by aggregation data 648. After aggregating the multiple curated datasets together, the reporting data object 640 can update in response to the transformation and provide an updated reporting data object indicating an updated relationship between the newly formed aggregated dataset and each curated dataset joined together to form the newly aggregated dataset. The functionality of the updated reporting data object discussed in relation to modification data 646 and aggregation data 648 provides the tenants of the data landing zone framework with a complete understanding of the transformations used create the aggregated dataset. The tenants may also access this new dataset or perform further operations on it based on their specific use case scenario.

Figure 7:
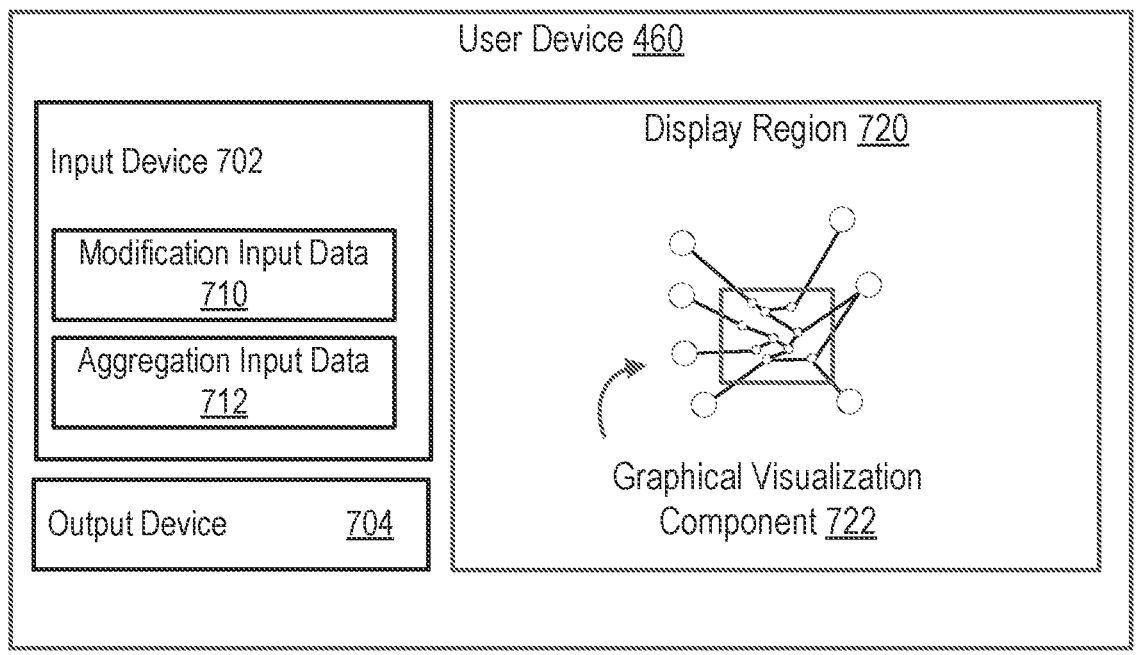
FIG. 7 is a block diagram of an example user device, according to some aspects of the present disclosure.

FIG. 7 is a block diagram of an example user device 460, according to some aspects of the present disclosure. The user device 460 provides a display region 720 that can present an intuitive data visualization based on the one or more reporting data object 640 generated by data landing zone framework 210. In addition, user device 460 can receive, via input device 702, one or more modification inputs that adjust the display in display region 720. The inputs can include, for example, modification data 710. Modification data 710 can include inputs from the user that adjusts the data processing rules discussed above in relation to curation layer 430. Additionally, and in response to the modification data, the reporting data object 640 from data landing zone framework 210 can update based on the modification data to create an updated reporting data object. The updated reporting data object can then be displayed in display region 720 as an intuitive data visualization.

Input device 702 of user device 460 also includes aggregation input data 712. Similar to the modification input data 710, aggregation input data 712 can include inputs instructing the processor to aggregate one or more datasets stored in the data landing zone framework 210 together. As discussed above, this may include a user aggregating together multiple source data, such as raw data 452. Additionally or alternatively, this may include a user aggregating together one or more curated datasets stored at the output target layer 440. Depending on the use case scenario, a user may need to join together either curated datasets or source data for various regulatory reporting requirements, forecasting, analytics, and other business specific tasks associated with their role, group, and organization. The reporting data object 640 can be updated to output an updated reporting data object based on the aggregation data.

As further illustrated in FIG. 7, display region 720 can generate a graphical visualization component that describes the reporting data object 640 or the updated reporting data object. The graphical visualization component 722 can visually display the data lineage for source data as it processes through the data landing zone framework 210 on a virtual canvas to thereby providing users with a complete understanding of the data lineage. Additionally, the graphical visualization component 722 can be interactive in a way that a user may interact with the various portions of the graphical visualization component 722 such as by using a mouse, keyboard, or other input device to select a portion of the graphical visualization component 722. When a user selects a portion of the graphical visualization component 722, the display region 720 may update or provide additional information in the form of text or another graphical visualization element to the user.

Although not illustrated, display region 720 may display a non-graphical visualization component such as text. In some examples, the text that is displayed by display region 720 can provide a user with a description of the data lineage associated with the reporting data object 640 generated by the processor at the output target layer 440. In some examples, the text associated with reporting data object 640 can describe a relationship of the data lineage. The relationship can indicate to the user the quality checks, enrichments, transformations, curations, and other data processing rules used on the curated dataset thereby providing a user with a complete three-hundred-and-sixty-degree view of the data. In other words, based on a target use case, a tenant or a user operating user device 460 can access data landing zone framework 10 to source the curated datasets and source data 450 needed for their particular use case scenario. Then, using the display region 720 in conjunction with the reporting data object 640, the user can explore and understand the data lineage of the various datasets. This complete view of the data provides a user with a total understanding of the datasets which ensures the reliability, accuracy, and ease in finding and fixing issues with the datasets. Once the user has verified the datasets for accuracy and completeness, for example, the user can apply the dataset to their specific use case scenario. Additionally, if further processing is required of the datasets, the user, via modification input data 710 and aggregation input data 712 of input device 702, can perform further transformations on the curated datasets. This will result in an updated reporting data object describing an updated data lineage, and a new curated dataset will be available in the data landing zone framework 210, with appropriate metadata labels, for other tenants to use and access.

The user device 460 also includes output device 704. Output device 704 can be connected to the display region 720 for outputting the reporting data object 640 or an updated reporting data object. Output device 704 may also be connected to other devices (not illustrated) that the user can interact with such as a printer, other applications, other computing devices and the like. For example, output device 704 can be connected, via a network, to a wireless printer. The user may send the graphical visualization component 722 via output device 704 to the printer for printing.

Figure 8:
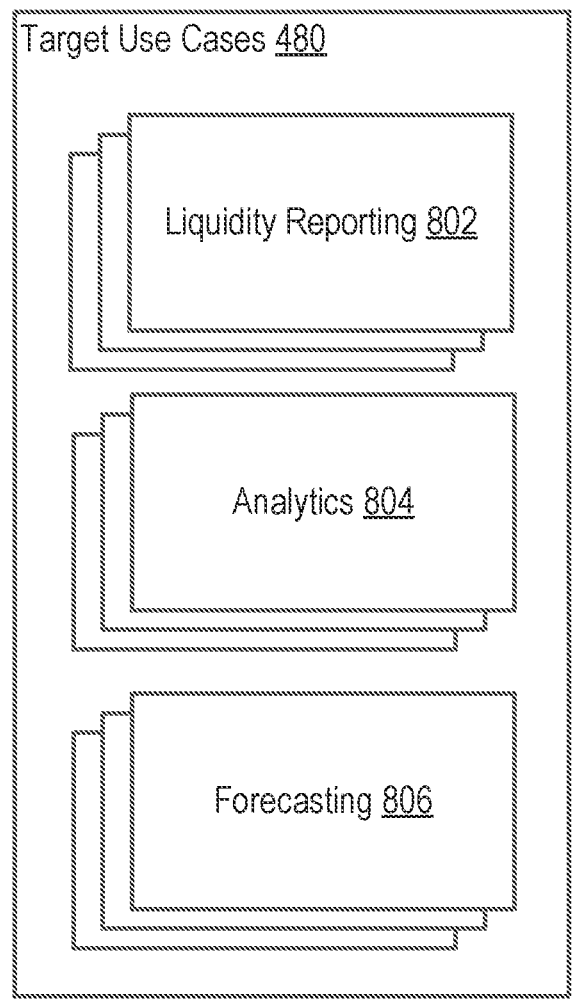
FIG. 8 is a block diagram illustrating an example of target use cases, according to some aspects of the present disclosure.

FIG. 8 is a block diagram illustrating an example of target use cases, according to some aspects of the present disclosure. As illustrated in FIG. 8, target use cases includes liquidity reporting 802, analytics 804, and forecasting 806. Although only these target use cases are illustrated in FIG. 8, there can be numerous other use cases and reporting. Additionally, and as discussed herein, a particular group or user of target use case 480 can be referred to as a tenant. For example, the business group responsible for liquidity reporting 802 may be referred to as a tenant. The systems described above provide the benefit that the tenant responsible for liquidity reporting 802 will continue to own their own logic and datasets and have their own applications. In other words, a liquidity reporting tenant can manage the data corresponding to the liquidity reporting (e.g., enrichment and curation) as it applies to their fit for purpose usage. Additionally, other tenants, such as the tenant responsible for analytics 804, can directly access the source data involved in liquidity reporting 802 or they can access the tenant's enriched and curated data corresponding to liquidity reporting 802. This provides for common curations of the datasets in a multi-tenant framework thereby reducing redundancies and increasing accuracy and speed to fit for purpose datasets.

Figure 9:
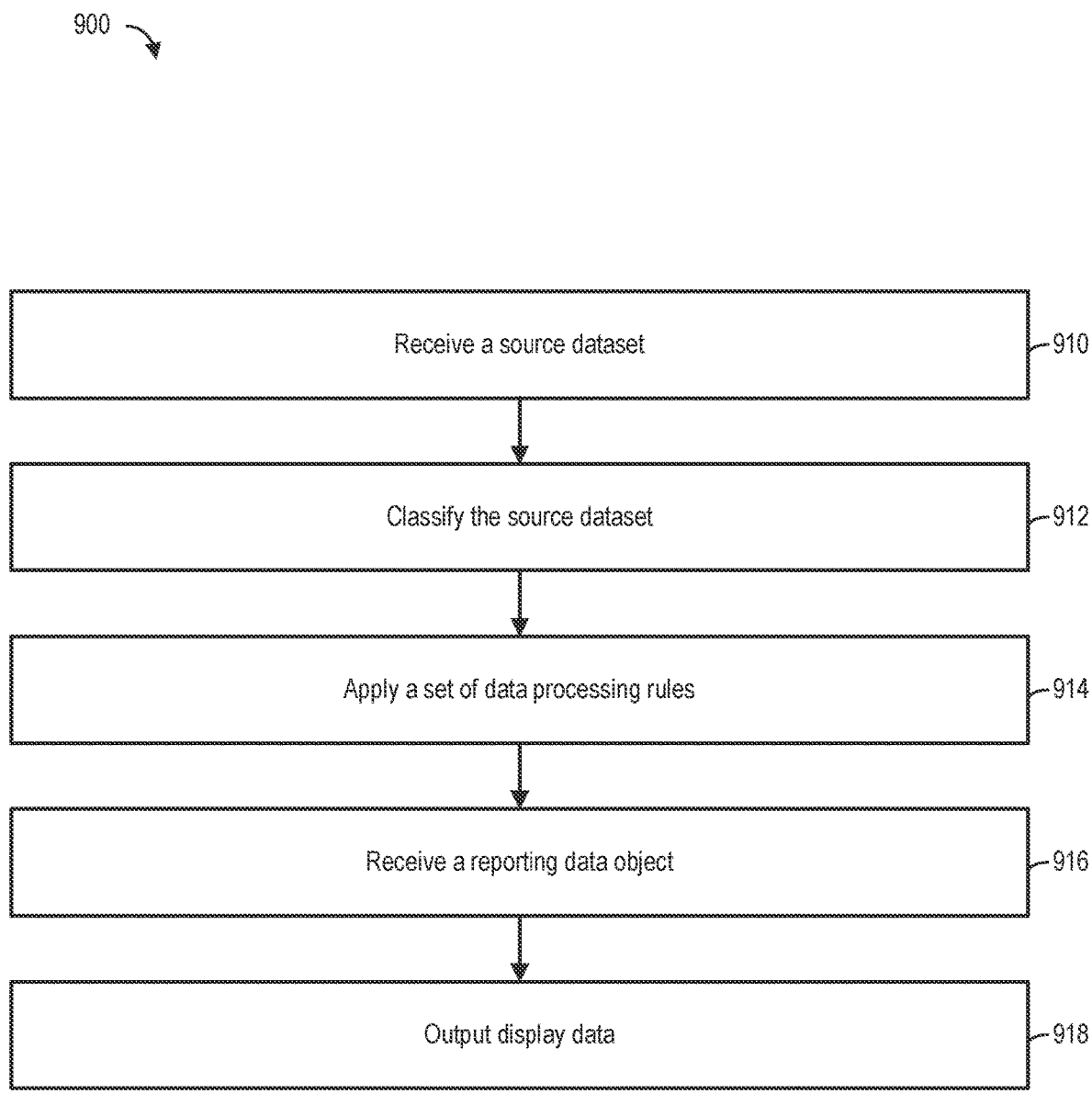
FIG. 9 is a flowchart of an example of a process for outputting display data, according to some aspects of the present disclosure.

FIG. 9 is a flow chart of an example of a process 900 for outputting display data, according to some aspects of the present disclosure. In some examples, such as examples described in regard to FIG. 3-8, a computing system implements operations described by FIG. 9, by executing suitable program code. In some cases, such as described in regard to FIG. 3-8, the computing system is in communication with a user device. For illustrative purposes, the process 900 is described with reference to the examples depicted in FIG. 3-8. Other implementations, however, are possible.

At block 910, the process 900 involves receiving a source dataset. According to some examples, the source dataset can describe source data corresponding to an enterprise. The source dataset can include daily source data information or monthly source information associated with the enterprise.

At block 912, the process 900 involves classifying the source dataset. Classifying the source data involves labeling the source data based on a use case scenario associated with the source data. Additionally, to reduce consumption of resources and maximize efficiency across an enterprise, a data dictionary of plain business terms can be used to classify the source dataset in a way that is normalized across an enterprise. This leads to ease of access and understanding the source dataset thereby improving efficiencies.

At block 914, the process 900 involves applying a set of data processing rules. In some examples, the set of data processing rules can correspond to the set of processing steps that occurs with the curation layer, such as curation layer 430. The set of data processing rules can include the processing rules to perform quality checks on the source dataset. The set of data processing rules can also include the processing rules to perform enrichment of the source dataset. The set of data processing rules can also include the processing rules corresponding to the transformations applied to the source dataset. The set of data processing rules can also correspond to the processing rules corresponding to storing the curated dataset. After the set of data processing rules are applied to the source dataset, the source dataset may be referred to as a curated dataset. The curated dataset may be labeled by metadata and assigned a tenant owner associated with the user in control of the curated dataset. The processor can perform operations to store the curated dataset into the memory or storage of the computing system.

At block 916, the process 900 involves receiving a reporting data object. A reporting data object can include information about the curated dataset. For example, the reporting data object can indicate a relationship between the curated dataset and the source dataset used to generate the curated dataset. In other words, the reporting data object includes information about the set of data processing rules that are performed on the source dataset in order to generate the curated dataset. The reporting data object can also include various types of data including reporting data, visualization data, modification data, and aggregation data.

Reporting data can correspond to the relationship between the curated dataset and the source dataset to describe a data lineage of the source dataset. The reporting data can be output, via the reporting data object of the computing system, to a server for storage. The reporting data can also be output, via the reporting data object of the computing system, to a user device and displayed on the display region of the user device to provide a user with a complete data lineage of the source dataset.

The reporting data object can also include visualization data. Visualization data can correspond to either a graphical (e.g., diagram, timeline, flowchart) or non-graphical (e.g., text, summary, etc.) representation of the data lineage of the source data or curated datasets. The visualization data can be output, via the reporting data object of the computing system, to a server for storage. The visualization data can also be output, via the reporting data object of the computing system, to a user device and displayed on the display region of the user device to provide a user with a complete data lineage of the source dataset.

The reporting data object can also include aggregation data. Aggregation data can correspond to an input received by the data landing zone framework to aggregate multiple curated datasets or source data together to generate an aggregated dataset. Aggregation of multiple datasets can be dependent on the use case scenario specified by the user. Once the multiple datasets are aggregated, the reporting data object can be updated to output an updated reporting data object indicating the updated data lineage of the source datasets aggregated together. This operation is discussed in more detail in relation to FIG. 10.

The reporting data object can also include modification data. Modification data can correspond to an input received by the data landing zone framework to modify a data processing rule used to generate the curated dataset. The modified data processing rule can modify the curated dataset based on the specific use case scenario required by the user. This operation is discussed in more detail in relation to FIG. 11.

At block 918, the process 900 involves outputting display data. The display data may be outputted by the computing system to a server where the display data is stored or otherwise processed. The server may be accessed by multiple users of an enterprise who may access the display data to obtain the data lineage of the source dataset as it compares to the curated dataset. Additionally, the display data can be outputted to a user device for display on a display region of the user device. The display region can display the display data for a user and can indicate the data lineage of the curated dataset. The data lineage can correspond to a relationship between the curated dataset and the source dataset by indicating the set of data processing rules used to generate the curated dataset.

Figure 10:
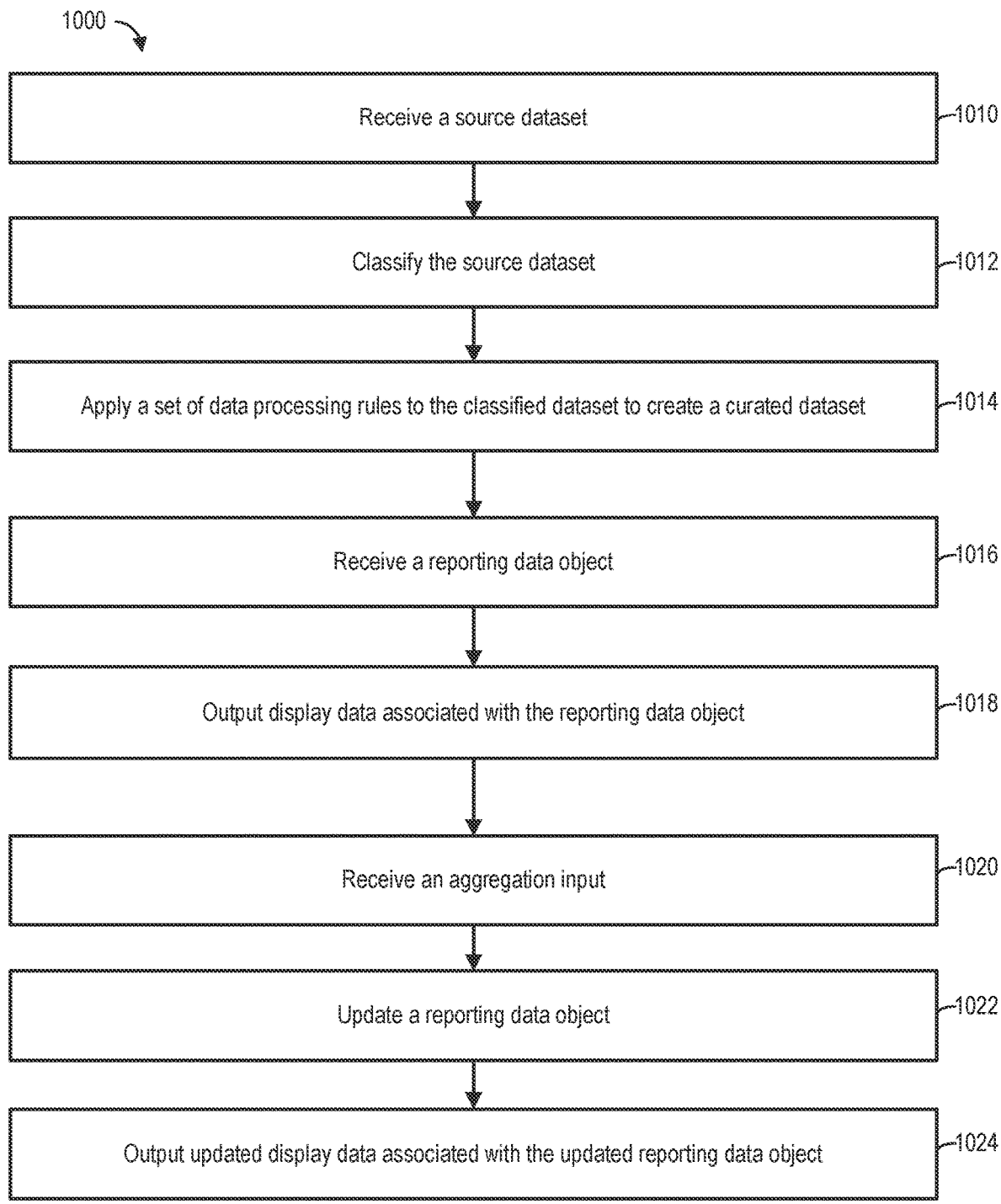
FIG. 10 is a flowchart of an example of a process for outputting display data, according to certain aspects of the present disclosure.

FIG. 10 is a flowchart of an example of a process 1000 for outputting display data, according to certain aspects of the present disclosure. Similar to above in relation to FIG. 9, in some examples, such as described in regard to FIG. 3-8, a computing system implements operations described by FIG. 10, by executing suitable program code. In some cases, such as described in regard to FIG. 3-8, the computing system is in communication with a user device. For illustrative purposes, the process 1000 is described with reference to the examples depicted in FIG. 3-8. Other implementations, however, are possible.

At block 1010, the process 1000 involves receiving a source dataset. According to some examples, the source dataset can describe source data corresponding to an enterprise. The source dataset can include daily source data information or monthly source information associated with the enterprise.

At block 1012, the process 1000 involves classifying the source dataset. Classifying the source data involves labeling the source data based on a use case scenario associated with the source data. Additionally, to reduce consumption of resources and maximize efficiency across an enterprise a data dictionary of plain business terms can be used to classify the source dataset in a way that is normalized across an enterprise. This leads to ease of access and understanding the source dataset thereby improving efficiencies.

At block 1014, the process 1000 involves applying a set of data processing rules to the classified dataset to create a curated dataset. In some examples, the set of data processing rules can correspond to the set of processing steps that occurs with the curation layer, such as curation layer 430. The set of data processing rules can include the processing rules to perform quality checks on the source dataset. The set of data processing rules can also include the processing rules to perform enrichment of the source dataset. The set of data processing rules can also include the processing rules corresponding to the transformations applied to the source dataset. The set of data processing rules can also correspond to the processing rules corresponding to storing the curated dataset. After the set of data processing rules are applied to the source dataset, the source dataset may be referred to as a curated dataset. The curated dataset may be labeled by metadata and assigned a tenant owner associated with the user in control of the curated dataset. The processor can perform operations to store the curated dataset into the memory or storage of the computing system.

At block 1016, the process 1000 involves receiving a reporting data object. A reporting data object can include information about the curated dataset. For example, the reporting data object can indicate a relationship between the curated dataset and the source dataset used to generate the curated dataset. In other words, the reporting data object includes information about the set of data processing rules described above that are performed on the source dataset in order to generate the curated dataset. The reporting data object can also include various types of data including reporting data, visualization data, modification data, and aggregation data, as discussed above. Reporting data can correspond to the relationship between the curated dataset and the source dataset to describe a data lineage of the source dataset. The reporting data can be output, via the reporting data object of the computing system, to a server for storage. The reporting data can also be output, via the reporting data object of the computing system, to a user device and displayed on the display region of the user device to provide a user with a complete data lineage of the source dataset.

At block 1018, the process 1000 involves outputting display data associated with the reporting data object. The display data may be outputted by the computing system to a server where the display data is stored. The server may be accessed by multiple users of an enterprise who may access the display data to obtain the data lineage of the source dataset as it compares to the curated dataset. Additionally, the display data can be outputted to a user device for display on a display region of the user device. The display region can display the display data for a user and can indicate the data lineage of the curated dataset. The data lineage can correspond to a relationship between the curated dataset and the source dataset by indicating the set of data processing rules used to generate the curated dataset.

At block 1020, the process 1000 involves receiving an aggregation input. Aggregation input can include inputs instructing the processor to aggregate one or more datasets stored in the data landing zone together. This can include a user aggregating together multiple source data, such as raw data 452. Additionally or alternatively, this may include a user aggregating together one or more curated datasets. Depending on the use case scenario, a user may need to join together either curated datasets or source data for various regulatory reporting requirements, forecasting, analytics, and other business specific tasks associated with their role, group, and organization.

At block 1022, the process 1000 involves updating the reporting data object. In response to the aggregation input, the reporting data object can update based on the aggregation input to create an updated reporting data object. The updated reporting data object includes information about an updated relationship between the new aggregated datasets and the source data and curated datasets used to create the newly aggregated dataset.

At block 1024, the process 1000 involves outputting updated display data associated with the updated reporting data object. The updated display data may be outputted by the computing system to a server where the display data is stored. The server may be accessed by multiple users of an enterprise who may access the display data to obtain the data lineage of the source dataset as it compares to the curated dataset. Additionally, the updated display data can be outputted to a user device for display on a display region of the user device. The display region can display the updated display data for a user and can indicate the data lineage of datasets aggregated together. The data lineage can correspond to a relationship between the aggregated datasets, the curated dataset, and the source dataset by indicating the set of data processing rules used to generate the curated dataset.

Figure 11:
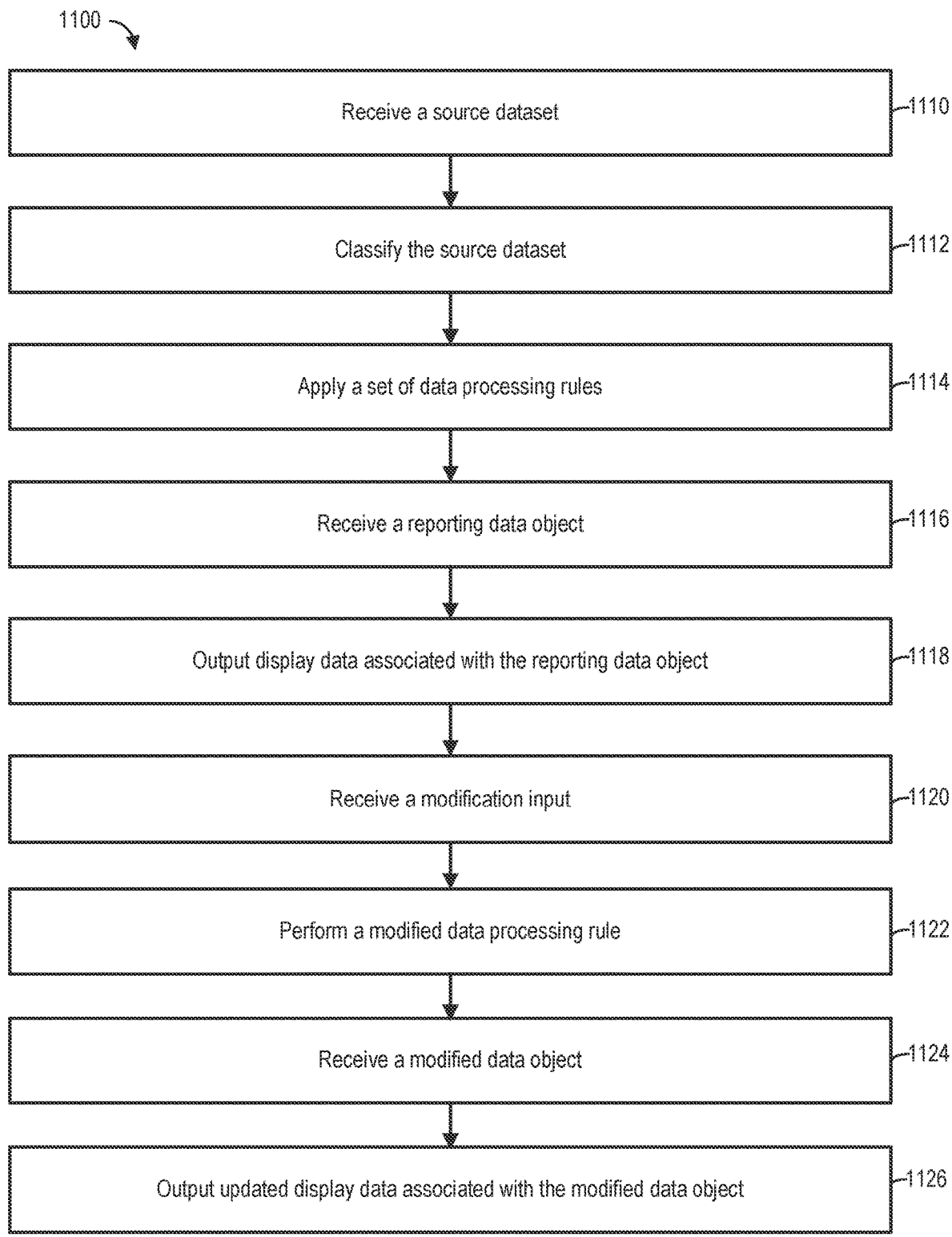
FIG. 11 is a flowchart of an example of a process for outputting display data according to certain aspects of the present disclosure.

FIG. 11 is a flowchart of an example of a process 1100 for outputting display data according to certain aspects of the present disclosure. Similar to above in relation to FIG. 10, in some examples, such as described in regards to FIG. 3-8, a computing system implements operations described by FIG. 11, by executing suitable program code. In some cases, such as described in regards to FIG. 3-8, the computing system is in communication with a user device. For illustrative purposes, the process 1100 is described with reference to the examples depicted in FIG. 3-8. Other implementations, however, are possible.

At block 1110, the process 1100 involves receiving a source dataset. According to some examples, the source dataset can describe source data corresponding to an enterprise. The source dataset can include daily source data information or monthly source information associated with the enterprise.

At block 1112, the process 1100 involves classifying the source dataset. Classifying the source data involves labeling the source data based on a use case scenario associated with the source data. Additionally, to reduce consumption of resources and maximize efficiency across an enterprise a data dictionary of plain business terms can be used to classify the source dataset in a way that is normalized across an enterprise. This leads to ease of access and understanding the source dataset thereby improving efficiencies.

At block 1114, the process 1100 involves applying a set of data processing rules. In some examples, the set of data processing rules can correspond to the set of processing steps that occurs with the curation layer, such as curation layer 430. The set of data processing rules can include the processing rules to perform quality checks on the source dataset. The set of data processing rules can also include the processing rules to perform enrichment of the source dataset. The set of data processing rules can also include the processing rules corresponding to the transformations applied to the source dataset. The set of data processing rules can also correspond to the processing rules corresponding to storing the curated dataset. After the set of data processing rules are applied to the source dataset, the source dataset may be referred to as a curated dataset. The curated dataset may be labeled by metadata and assigned a tenant owner associated with the user in control of the curated dataset. The processor can perform operations to store the curated dataset into the memory or storage of the computing system.

At block 1116, the process 1100 involves receiving a reporting data object. A reporting data object can include information about the curated dataset. For example, the reporting data object can indicate a relationship between the curated dataset and the source dataset used to generate the curated dataset. In other words, the reporting data object includes information about the set of data processing rules described above that are performed on the source dataset in order to generate the curated dataset. The reporting data object can also include various types of data including reporting data, visualization data, modification data, and aggregation data, as discussed above. Reporting data can correspond to the relationship between the curated dataset and the source dataset to describe a data lineage of the source dataset. The reporting data can be output, via the reporting data object of the computing system, to a server for storage. The reporting data can also be output, via the reporting data object of the computing system, to a user device and displayed on the display region of the user device to provide a user with a complete data lineage of the source dataset.

At block 1118, the process 1100 involves outputting display data associated with the reporting data object. The display data may be outputted by the computing system to a server where the display data is stored. The server may be accessed by multiple users of an enterprise who may access the display data to obtain the data lineage of the source dataset as it compares to the curated dataset. Additionally, the display data can be outputted to a user device for display on a display region of the user device. The display region can display the display data for a user and can indicate the data lineage of datasets aggregated together. The data lineage can correspond to a relationship between the aggregated datasets, the curated dataset, and the source dataset by indicating the set of data processing rules used to generate the curated dataset.

At block 1120, the process 1100 involves receiving a modification input. Modification input can include inputs instructing the processor to modify one or more of the data processing rules used to generate one or more of the curated datasets. Depending on the use case scenario, a user or tenant may need to applying further processing to curated datasets for various regulatory reporting requirements, forecasting, analytics, and other business specific tasks associated with their role, group, and organization.

At block 1122, the process 1100 involves performing a modified data processing rule. At this block, the modification input describing a data processing rule can be applied to one or more curated datasets or source data. Once the modified data processing rule is applied, the curated dataset can be referred to as a modified curated dataset.

At block 1124, the process 1100 involves receiving a modified data object. In response to the modification input, the modified data object can update based on the modification input to create the modified data object. The modified data object can include information about an updated relationship between the modified curated datasets and the source data and curated datasets that form the original data of the modified curated dataset.

At block 1126, the process 1100 involves outputting updated display data associated with the modified data object. The updated display data may be outputted by the computing system to a server where the display data is stored. The server may be accessed by multiple users of an enterprise who may access the display data to obtain the data lineage of the source dataset as it compares to the curated dataset. Additionally, the updated display data can be outputted to a user device for display on a display region of the user device. The display region can display the updated display data for a user and can indicate the data lineage of datasets aggregated together. The data lineage can correspond to a relationship between the modified curated datasets, the curated dataset, and the source dataset by indicating the set of data processing rules used to generate the modified curated dataset.

GENERAL CONSIDERATIONS

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art.

What is claimed is:

1. A method for providing a data lineage comprising:
receiving a source dataset corresponding to a use case scenario;
classifying the source dataset based on the use case scenario to create a classified dataset;
applying a set of data processing rules to the classified dataset to create a curated dataset;
storing the curated dataset in a network accessible data store comprising a plurality of curated datasets;
receiving a reporting data object indicating a relationship between the source dataset and the curated dataset, wherein the relationship describes a data lineage of the source dataset;
receiving, via one or more input devices, an aggregation input, wherein the aggregation input corresponds to joining together one or more curated datasets from the plurality of curated datasets;

updating a modification data object, in response to receiving the aggregation input, to create an updated modification data object, wherein the updated modification data object comprises data associated with an updated relationship between the one or more curated datasets joined together; and outputting display data associated with the reporting data object and the updated modification data object.

2. The method of claim 1, wherein the source dataset comprises financial data.

3. The method of claim 1, wherein the data lineage comprises characteristics of the source dataset and the curated dataset, wherein the characteristics include at least one of: the set of data processing rules used to create the curated dataset, the use case scenario corresponding to the source dataset, or a type of data contained in the source dataset.

4. The method of claim 1, wherein the display data comprises a graphical visualization component.

5. The method of claim 1 further comprising:
performing a validation check on the source dataset to analyze an accuracy measurement of the source dataset.

6. The method of claim 1, wherein classifying the source dataset based on the use case scenario comprises labeling the source dataset with metadata.

7. The method of claim 1, wherein display data comprises a combination of textual descriptions and graphical visualization components.

8. The method of claim 1, further comprising:
receiving, via one or more input devices, a modification input that describes a modification to at least one of the set of data processing rules to create a modified data processing rule;
performing the modified data processing rule to the classified dataset to create a modified curated dataset;
receiving a modified data object indicating a modified relationship between the curated dataset and the modified curated dataset; and
outputting updated display data associated with the modified data object.

9. A system comprising:
a processor coupled to a memory that stores instructions that, when executed by the processor, cause the processor to:
receive a source dataset corresponding to a use case scenario;
classify the source dataset based on the use case scenario to create a classified dataset;
apply a set of data processing rules to the classified dataset to create a curated dataset;
store the curated dataset in a network accessible data store comprising a plurality of curated datasets;
receive a reporting data object indicating a relationship between the source dataset and the curated dataset, wherein the relationship describes a data lineage of the source dataset;
receive, via one or more input devices, an aggregation input, wherein the aggregation input corresponds to joining together one or more curated datasets from the plurality of curated datasets;
update a modification data object, in response to receiving the aggregation input, to create an updated modification data object, wherein the updated modification data object comprises data associated with an updated relationship between the one or more curated datasets joined together; and
output display data associated with the reporting data object and the updated modification data object.

10. The system of claim 9, wherein the source dataset comprises financial data.

11. The system of claim 9, wherein the data lineage comprises characteristics about the source dataset and the curated dataset, wherein the characteristics include at least one of: the set of data processing rules used to create the curated dataset, the use case scenario corresponding to the source dataset, or a type of data contained in the source dataset.

12. The system of claim 9, wherein the display data comprises a graphical visualization component.

13. The system of claim 9, wherein the instructions stored in the memory further cause the processor to:
perform a validation check on the source dataset to analyze an accuracy measurement of the source dataset.

14. The system of claim 9, wherein the instructions stored in the memory further cause the processor to label the source dataset with metadata.

15. The system of claim 9, wherein the display data comprises a combination of textual descriptions and graphical visualization components.

16. The system of claim 9, wherein the instructions stored in the memory further cause the processor to:
receive, via one or more input devices, a modification input that describes a modification to at least one of the set of data processing rules to create a modified data processing rule;
perform the modified data processing rule to the classified dataset to create a modified curated dataset;
receive a modified data object indicating a modified relationship between the curated dataset and the modified curated dataset; and
output updated display data associated with the modified data object.

17. A non-transitory computer-readable medium embodying program code that, when executed by a processor, causes the processors to perform operations comprising:
receiving a source dataset corresponding to a use case scenario;
classifying the source dataset based on the use case scenario to create a classified dataset;
applying a set of data processing rules to the classified dataset to create a curated dataset;
storing the curated dataset in a network accessible data store comprising a plurality of curated datasets;
receiving a reporting data object indicating a relationship between the source dataset and the curated dataset, wherein the relationship describes a data lineage of the source dataset;
receiving, via one or more input devices, an aggregation input, wherein the aggregation input corresponds to joining together one or more curated datasets from the plurality of curated datasets;
updating a modification data object, in response to receiving the aggregation input, to create an updated modification data object, wherein the updated modification data object comprises data associated with an updated relationship between the one or more curated datasets joined together; and
outputting display data associated with the reporting data object and the updated modification data object.

18. The non-transitory computer-readable medium of claim 17, wherein the source dataset comprises financial data.

* * * * *